(12) United States Patent
Blitz

(10) Patent No.: US 6,492,931 B1
(45) Date of Patent: Dec. 10, 2002

(54) ELECTRONIC COUNTERMEASURES SYSTEM AND METHOD

(76) Inventor: Daniel Blitz, 242 Beacon St., Boston, MA (US) 02116

( * ) Notice: Subject to any disclaimer, the term of this patent is extended or adjusted under 35 U.S.C. 154(b) by 0 days.

(21) Appl. No.: 06/468,239

(22) Filed: Feb. 15, 1983

(51) Int. Cl.⁷ ................................................. G01S 7/38
(52) U.S. Cl. ......................................................... 342/15
(58) Field of Search ........................... 343/18 D, 18 E; 342/15, 14, 13; 455/1

(56) References Cited

U.S. PATENT DOCUMENTS 2,931,031 A * 3/1960 Deloraine et al. ........ 343/18 E

* cited by examiner

Primary Examiner—John B. Sotomayor

(57) ABSTRACT

An electronic countermeasures system wherein part of the system is contained within the aircraft to be protected and part in an expendable decoy. Signals from enemy radars are received on-board the aircraft to be protected, processed and transmitted to the expendable decoy where the received signals are further processed and transmitted to the enemy radar to cause the enemy radar to track the decoy target.

13 Claims, 1 Drawing Sheet

ELECTRONIC COUNTERMEASURES SYSTEM AND METHOD

BACKGROUND OF THE INVENTION

This invention relates to countermeasure techniques for protecting aircraft from enemy attack and, more particularly, to a means of protecting an aircraft by deceiving an enemy into tracking a decoy target.

Various systems are being employed and have been proposed for protecting aircraft from enemy attack, including the use of radar jamming equipment on the aircraft. When the threat is from tracking or missile seeker radars employing monopulse or pseudo-monopulse angular error sensing mechanisms, the difficulty of countermeasuring increases since few effective electronic countermeasure techniques against them exist. One of the well-known techniques is that of producing false targets at a physical distance from the aircraft under attack.

One means of producing such false targets is to employ expendable, active decoys. These devices are ejected from an aircraft when under attack and usually contain active electronic components for transmitting signals which confuse and deceive an enemy radar or missile into tracking the decoy rather than the aircraft itself.

One type of such expendable, active decoy includes a single port, keyed primed oscillator which is primed with the low level signal received at its antenna from an enemy's tracking radar. The priming signal is injected directly into the tank circuit of the oscillator which is being rapidly turned on and off (keyed), producing a rapidly pulsed signal which tracks the frequency of the priming signal. The resultant signal from the oscillator is transmitted back to the receiving section of the enemy radar, keyed at such a high PRF that the receiver cannot distinguish the individual pulses of returned energy. Thus, the signal from the decoy is detected as a replica of the original radar transmission, even if it is a CW signal. This type of decoy has worked very well, but is limited in its ability to make full use of the average power capability of the components used for transmission. This limitation is due to the fact that the primed oscillator is keyed such that it has a duty factor very much less than 100% and, accordingly, the average power which can be transmitted from components which are peak power limited is restricted.

An alternative approach for expendable, active decoys is to employ a two-port device, having both an input and an output antenna wherein a signal from the enemy radar, which is received at a first antenna, is amplified in the expendable decoy, and then transmitted back to the radar from a second antenna. While this technique apparently permits generation of larger average power from the components than using the keyed, primed oscillator, it also has severe gain limitations since it is extremely difficult to isolate the receiving and transmitting antennas adequately from each other, particularly in an expendable device of relatively small size. If such a device is operated at a high duty factor, the coupling from the transmitter to the receiver would cause interfering feedback. Therefore, it is required that such a device be operated at reduced duty factor which reduces the effective power output and, thus, at a corresponding reduction in effectiveness.

Accordingly, it is an object of this invention to provide improved electronic countermeasures.

It is another object of this invention to provide improved expendable decoy countermeasures.

It is a further object of this invention to provide improved electronic countermeasures in which the electronics is, in part, located in the aircraft to be protected and in part, in expendable decoys.

SUMMARY OF THE INVENTION

Briefly, in one embodiment of the invention, improved electronic countermeasures is provided by greatly increasing the separation between the decoy's receiving and transmitting antennas by placing the radar signal sensing receiver and its antenna on the aircraft and the countermeasures transmitter and its antenna on the expendable decoy. This provides ample isolation between the transmitter and receiver such that the transmitter can be operated continuously at maximum effectiveness. The incoming signal from, for example, an enemy tracking radar is applied to a receiver in the aircraft to be protected and mixed with a signal generated by a local oscillator in the receiver. The signal from the mixer, at a frequency which is the difference between that of the received radar signal and the local oscillator, is transmitted to the expendable decoy along with the signal from the local oscillator as a reference. As the decoy is only a short distance from the aircraft and trailing behind, a rearward facing antenna and very low power transmissions can be used by the aircraft, minimizing the probability of detection of its transmissions by the enemy.

These two signals are received from the aircraft at the decoy, amplified and mixed to generate a signal at a frequency which is the sum of that of the local oscillator and difference signal and, thus, at the same frequency as that of the tracking radar. The signal is then transmitted by the decoy to the tracking radar. The signal is a duplicate of the original radar signal and due to the nature of the decoy trailing behind and falling away from the aircraft, the enemy radar is given false bearing, range and doppler information.

The signal transmitted by the expendable decoy is at a completely different frequency band from that of the two signals it receives from the aircraft. Therefore, both the transmitter and receiver in the expendable decoy can be made to share a common antenna without any problem of mutual interference.

BRIEF DESCRIPTION OF THE DRAWINGS

The above-mentioned and other features and objects of this invention will become more apparent by reference to the following description taken in conjunction with the accompanying drawings, in which.

DESCRIPTION OF A PREFERRED EMBODIMENT

Figure 1:
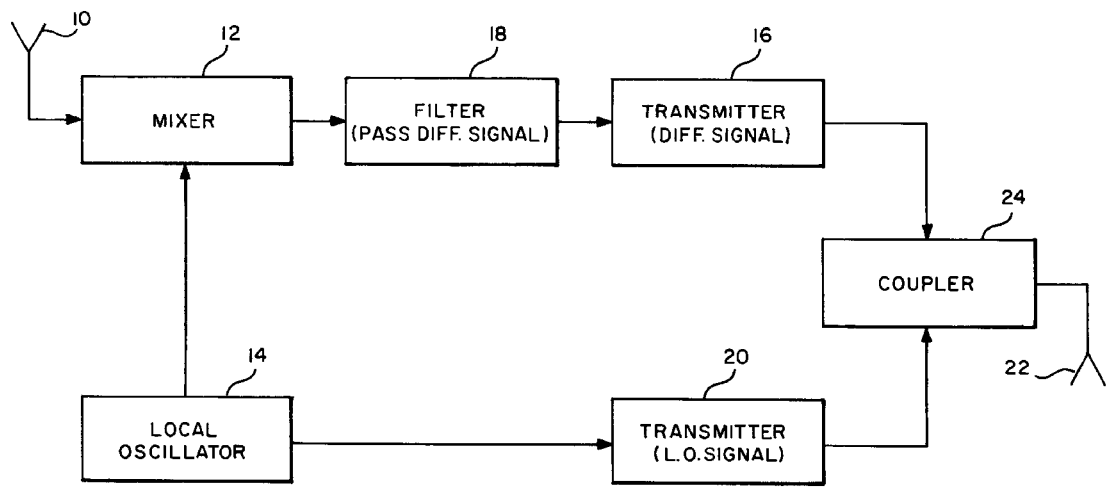
FIG. 1 is a block diagram of the electronics housed within the aircraft to be protected.

Referring now to FIG. 1 of the drawings, there is illustrated thereby a block diagram of the countermeasures electronics which is housed within the aircraft to be protected. While the embodiment described references use of the invention in conjunction with aircraft, the principles are applicable to any possible targets to be protected including ships, land vehicles, etc. This circuit includes an antenna 10 for receiving incoming signals from an enemy tracking radar which could be either a stationary or mobile radar or illuminator or a radar employed in a guided missile. The signal from antenna 10 is applied to a mixer 12 where it mixed with the signal generated by a local oscillator 14. The output from mixer 12 is applied to a transmitter 16 via a filter 18. Filter 18 passes only the difference frequency signal from the mixer 12. The output from local oscillator 14 is also applied to a second transmitter 20. The outputs from the transmitters 16 and 20 are applied to a transmitting antenna 22 via a coupler 24 for transmitting the signals to an expendable decoy which is ejected from the aircraft to be protected. Although an ejected expendable decoy is preferred, other decoys may be used such as towed decoys, balloon supported decoys, etc. Amplification may be provided where necessary such as between antenna 10 and mixer 12. Also, transmitters 16 and 20 may be combined into a single transmitter, provided that its non-linearity is sufficiently low that any mixing it does of the two signals being transmitted does not produce a signal at the original radar frequency strong enough to interfere with reception of the enemy's radar signal being received by antenna 10, or stronger than the signal transmitted by the decoy and thus, act as a beacon to the enemy radar.

Figure 2:
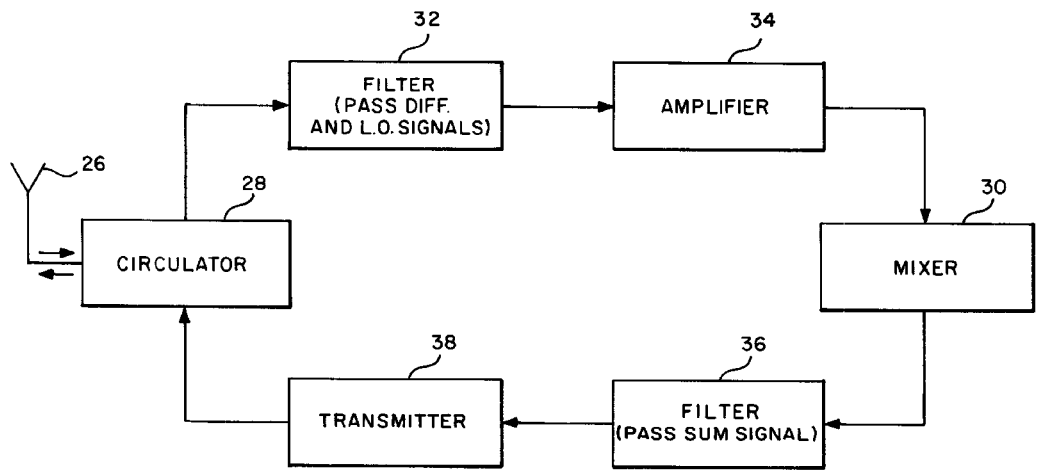
FIG. 2 is a block diagram of the electronics housed within the expendable decoy.

FIG. 2 of the drawings illustrates the portion of the countermeasures system which is contained within the expendable decoy. It includes a receiving/transmitting antenna 26 which receives the two signals transmitted by antenna 22 from the aircraft to be protected. These signals are applied via a circulator 28 to a mixer 30 via a filter 32 and amplifier 34 which permit only the two signals transmitted by the aircraft to be protected to be applied to the mixer 30 and not any of the signals of a frequency which may be received from an enemy radar. The output of mixer 30 is applied to a filter 36 which filters out the outputs from the mixer 30 except for the signal of the frequency which is the sum of the frequencies of the two signals applied to the mixer 30. This signal is applied to a transmitter 38 which is coupled to antenna 26 via circulator 28 for transmission to the enemy radar, which will receive doppler, range and bearing information falsified by the motion and location of the decoy.

While a circulator 28 has been shown for this embodiment, because of the large difference in frequency between the received and transmitted signals, it can be replaced by diplexing filters. For example, the incoming signals from antenna 26 can be coupled through filters which pass the two signals from the aircraft to be protected to amplifier 34 while rejecting signals from the tracking radar and from transmitter 38. Likewise, the output from transmitter 38 can be coupled to antenna 26 via filters which pass the signal from the transmitter while rejecting the two signals received from the aircraft to be protected.

The principles of this invention will now be explained in conjunction with an example using typical frequencies, however, these are only used for tutorial purposes and have no bearing on the limitations or bounds of the invention. Assuming the signal from the enemy tracking radar to be 11 GHz, this signal is received and applied to mixer 12 along with, for example, a 6 GHz signal generated by local oscillator 14. The 6 and 11 GHz signals are mixed in mixer 12 and one of the outputs therefrom is a 5 GHz heterodyned signal. This 5 GHz signal is isolated from the other outputs by filter 18 and it alone is fed to the 5 GHz transmitter 16. Transmitter 20, likewise, transmits only the 6 GHz signal from the local oscillator 14. The 5 and 6 GHz signals are then transmitted to the decoy via antenna 22.

The 5 and 6 GHz signals from antenna 22 of the aircraft are received at antenna 26 of the decoy and applied to mixer 30 to generate an 11 GHz heterodyned signal which is applied to the 11 GHz transmitter 38 and transmitted via antenna 26 towards the tracking radar.

In addition to the feature of providing large isolation between antennas which allows continuous operation of the transmitter, thereby allowing large amounts of average power to be generated from the expendable decoy transmitter, this invention also permits many different kinds of signal processing to be carried out on the aircraft to be protected. As the aircraft's receiver/transmitter is non-expendable, it is practical to make it very sophisticated in its ability to select the kinds of response the decoy is to make to the radar threat. By gating, shifting frequencies, modulating, or otherwise controlling the transmission of the L.O. reference and heterodyned signals to the decoy, it can be made capable of selecting the operating frequency of the decoy, selecting the threats of greatest urgency to which the decoy is to respond, selecting response to either CW or pulsed radars, inhibiting response to signals from friendly radars, shifting the L.O. reference frequency as well as the relayed signal frequency transmitted to the decoy for security or other purposes, modulating the amplitude or frequency of the decoy's response for improved countermeasure effectiveness, for example to simulate a false doppler frequency, etc. Such variations in response can be made without modification or adjustment of the expendable decoy and, in fact, the kind of response can even be changed during the flight of the decoy after it has separated from the launching aircraft.

Such signal processing cannot be effectively done in the decoy in the prior art devices, since (1) the decoy must be kept very small and therefore, the number of components which can be contained therein is limited, (2) the decoy must be kept relatively inexpensive since it is expendable, and (3) it is impractical to make any changes to the decoy after it is loaded in the aircraft as it usually has no umbilical electrical connections nor is it physically accessible.

While the embodiment of the invention described makes use of the difference outputs of the miser in the aircraft receiver and the sum outputs of the mixer in the decoy, the opposite may be employed. That is, antenna 22 may instead transmit the sum of the frequencies of the incoming radar signal and the local oscillator signal, along with the local oscillator signal, and antenna 26 may output the difference frequency between the local oscillator signal and the summed signal. Thus, it is to be understood that the embodiment shown is illustrative only and that many variations and modifications may be made without departing from the principles of the invention herein disclosed and defined by the appended claims.

I claim:

1. An electronic countermeasures system for protecting a real target of an enemy radar by deceiving an enemy into tracking a false target, comprising:
   means located in the real target for receiving the signal transmitted by an enemy radar;
   means located in the real target for altering the received signal;
   means for transmitting the altered signal;
   a decoy which can be displaced from the real target;
   means located in the decoy for receiving the altered signal;
   means located in the decoy for modifying the altered signal; and
   means located in the decoy for transmitting the modified signal.

2. An electronic countermeasures system as defined in claim 1, wherein said altering means includes a local oscillator for generating a local oscillator signal and a mixer for mixing the signal generated by the local oscillator and the signal received from an enemy radar's transmissions to generate a mixed signal.

3. An electronic countermeasures system as defined in claim 2, wherein said mixed signal has a frequency which is the difference between the frequency of the signal transmitted by an enemy radar and that of the local oscillator signal.

4. An electronic countermeasures system as defined in claim 2, wherein said mixed signal has a frequency which is the sum of the frequencies of the signal transmitted by an enemy radar and the local oscillator signal.

5. An electronic countermeasures system as defined in claim 2, wherein said transmitting means includes means for transmitting said mixed signal and said local oscillator signal.

6. An electronic countermeasures system as defined in claim 5, wherein said modifying means includes means for mixing the mixed signal and said local oscillator signal for generating a signal having the frequency of the signal from the enemy radar transmission.

7. A method for protecting a real target of an enemy radar by deceiving an enemy into tracking a false target, comprising the steps of:

deploying a decoy from the real target;

receiving in the real target the signal transmitted by an enemy radar;

altering the signal in the real target received from the enemy radar;

transmitting the altered signal to the decoy;

receiving the altered signal at the decoy;

modifying the altered signal in the decoy; and transmitting the modified signal from the decoy.

8. The method of claim 7, wherein said altering step includes the steps of generating a local oscillator signal in the real target and mixing the local oscillator signal with the signal received from the enemy radar thereby generating a mixed signal.

9. The method of claim 8, wherein said transmitting step includes the step of transmitting said mixed signal and said local oscillator signal.

10. The method of claim 9, wherein said modifying step includes the steps of mixing the mixed signal and the local oscillator signal for generating a signal having the frequency of the signal transmission from the enemy radar.

11. An electronic countermeasures system for protecting a real target of an enemy radar by deceiving an enemy into tracking a false target, comprising:

means located in the real target for receiving and processing the signal transmitted by an enemy radar;

means located in the real target for transmitting the processed signal to a decoy;

a decoy;

means located on the decoy for receiving and processing the signal transmitted from the real target; and means located in the decoy for transmitting the decoy processed signal.

12. An electronic countermeasures system as defined in claim 11, wherein said real target processing means includes means for changing the frequency of the signal received from the enemy radar.

13. An electronic countermeasures system as defined in claim 12, wherein said decoy processing means includes means for changing the frequency of the signal received from the real target to the frequency of the threat signal from the enemy radar.

* * * * *